United States Patent [19]

Aeschbach et al.

[11] Patent Number: 5,525,260
[45] Date of Patent: Jun. 11, 1996

[54] PREPARATION OF SPICE EXTRACT ANTIOXIDANT IN OIL

[75] Inventors: Robert Aeschbach, Vevey; Hans-Juergen Wille, Villeneuve, both of Switzerland

[73] Assignee: Nestec S.A, Vevey, Switzerland

[21] Appl. No.: 837,477

[22] Filed: Feb. 18, 1992

[30] Foreign Application Priority Data

Mar. 30, 1991 [EP] European Pat. Off. ............. 91105128

[51] Int. Cl.$^6$ .................................................. C09K 15/00
[52] U.S. Cl. ...................... 252/398; 426/429; 426/253; 426/481; 426/488; 426/542; 426/654; 426/655
[58] Field of Search .................................. 426/429, 253, 426/481, 488, 542, 654, 655; 252/398, 404

[56] References Cited

U.S. PATENT DOCUMENTS

| | | | |
|---|---|---|---|
| 3,732,111 | 5/1973 | Berner et al. | 426/542 |
| 3,950,266 | 4/1976 | Chang et al. | 252/398 |
| 4,012,531 | 3/1977 | Viani | 426/431 |
| 4,352,746 | 10/1982 | Bracco et al. | 252/398 |
| 4,363,823 | 12/1982 | Kimura et al. | 252/398 |
| 4,380,506 | 4/1983 | Kimura et al. | 252/398 |
| 4,450,097 | 5/1984 | Nakatani et al. | 252/398 |
| 5,026,550 | 6/1991 | Aeschbach et al. | 426/542 |

FOREIGN PATENT DOCUMENTS

| | | |
|---|---|---|
| 0038959 | 11/1981 | European Pat. Off. . |
| 2192852 | 2/1974 | France . |

OTHER PUBLICATIONS

Translation of Kobayashi et al. Re: Japanese Application 58 208 383 (1983).
Derwent WPIL accession No. 84–015010 Re: Japanese Application 58 208 383.
European Search Report 91105128 (1991).

*Primary Examiner*—Gary Geist
*Assistant Examiner*—Valerie Fee
*Attorney, Agent, or Firm*—Vogt & O'Donnell

[57] ABSTRACT

An oil containing a spice extract which has antioxidant activity is prepared by mixing a spice extract contained in a polar solvent with an oil, evaporating the polar solvent from the mixture, adding a non-polar solvent to the mixture, to dilute the mixture and to precipitate constituents of the mixture, and stirring to obtain a homogenized non-polar solvent/extract/oil mixture, separating precipitate from that mixture and then evaporating the non-polar solvent phase to obtain an oil containing spice extract. The oil containing the spice extract may be mixed with further polar solvent containing the spice extract, after which the process is repeated to enrich the final oil product with spice extract.

14 Claims, No Drawings

PREPARATION OF SPICE EXTRACT ANTIOXIDANT IN OIL

BACKGROUND OF THE INVENTION

This invention relates to a process for the production of a liquid antioxidant spice extract.

In conventional processes for the production of natural antioxidant extracts from spices, the end product is generally a powder. This powder cannot always be used as such because its incorporation in certain media, particularly liquid media, can present problems in regard to complete solubilization which make the end product unacceptable. For certain applications, therefore, the antioxidant powder first has to be dissolved in a liquid phase. A neutral and inert edible oil is preferably used as the liquid phase. However, precipitates are formed even during incorporation of the powder in an oil. These precipitates are difficult to eliminate by filtration and are troublesome in the preparation of products to be stabilized for technological reasons and for reasons of appearance.

Japanese patent application JP 58-208 383 (Hasegawa Koryo KK) relates to a liquid antioxidant containing a mixture of saturated $C_{6-12}$ fatty acid triglycerides and natural antioxidants from sage and rosemary. These spices are conventionally extracted, dried and mixed with the triglyceride mixture. The disadvantage of this system is that it does not enable a clear antioxidant concentrate to be obtained and/or, on the other hand, deposits are formed during storage due to the presence of constituents partly soluble in the triglyceride, resulting in a thixotropic effect.

The fact that it is not clear makes the liquid antioxidant product inhomogeneous and more difficult to incorporate in the compound to be treated.

SUMMARY OF THE INVENTION

The problem addressed by the present invention was to provide a process for the production of liquid natural antioxidants which would give a clear, non-thixotropic composition that would not form any deposits in the event of prolonged storage.

The present invention relates to a process for the production of a liquid antioxidant spice extract, in which an extract of the spice obtained from a polar solvent is mixed with oil, the polar solvent is evaporated, a non-polar solvent is added to the paste thus obtained, and after homogenization, the precipitate is separated and the non-polar solvent is evaporated to obtain a clear oil of antioxidant extract.

The process according to the invention may be carried out in a single stage (Examples 1 to 3 and 5), i.e., the entire quantity of spice extract is directly mixed with the saturated oil to obtain a clear oil of antioxidant extract after the above-mentioned treatment.

For practical reasons, however, the process according to the invention may also be carried out in several stages from the mixture of fractionated spice extract which, for each fraction, reduces the content of substances insoluble in the oil which are to be eliminated (Example 4). Accordingly, the same procedure as above is adopted, but with only one fraction of the spice extract, to obtain a clear oil of antioxidant extract. A second fraction of spice extract in the polar solvent is then mixed with the above-mentioned oil and the preceding operations, namely evaporation of the polar solvent, addition of the non-polar solvent to the paste obtained, homogenization, separation of the precipitate and evaporation of the non-polar solvent, are repeated to obtain another clear oil of antioxidant extract. If the spice extract has been fractionated into more than two fractions, the process may be continued by repeating the operations as described above.

For the purposes of the following description, the process is assumed to be carried out in a single stage, although it should be understood that what is said for one stage is equally valid where the process is carried out in several stages.

The lipidic composition obtained in accordance with the invention may be used in frying oils, mayonnaise, margarine and also in salami, ham, cereals, fish and any other food, cosmetic or pharmaceutical product requiring protection against oxidation. Hence, the oil employed is one which is suitable for incorporation into food, pharmaceutical and cosmetic products.

DETAILED DESCRIPTION OF THE INVENTION

The spice used as starting material may be any spice containing antioxidant principles, such as sage, rosemary, thyme, oregano or savory or cloves, either individually or in admixture. By the term spice is meant both the whole or ground spice" and also spice residues, i.e., spices which have been stripped with steam or even spices which have subjected to the treatment according to EP 307 626.

The polar solvent used is selected from $C_{1-4}$ alcohols, volatile ketones, acetone and methyl ethyl ketone, ethyl acetate or diethyl ether. Ethanol or methanol is preferably used. By the phrase "spice extract obtained from a polar solvent" is meant the extract obtained by subjecting the spice to be treated to refluxing or percolation in countercurrent either continuously or in batches. This extract contains most of the antioxidant components of the spice.

The oil used must be liquid at ambient temperature and preferably at the refrigerator storage temperature. It is selected from a mixture of saturated $C_{6-12}$ fatty acid triglycerides, or olive oil, hybrid sunflower oil, hybrid safflower oil, olein of cocoa butter and olein of sal fat. The triglyceride mixture is preferably a mixture of $C_{8-10}$ fatty acids, namely caprylic and capric acid. The polar solvent extract phase must be free from any undissolved particles (apolar substances) before addition of the oil.

The oil is mixed with the polar solvent extract phase in a ratio by weight of oil to dry spice extract of 10:1 to 1:2. The polar solvent is then completely evaporated by heating in vacuo, leaving a paste which has the disadvantage of being viscous and clouded and of containing a significant proportion of substances insoluble in the oil. It is very difficult to separate the insoluble substances from this treacle-like paste, above all by conventional processes, such as filtration and centrifugation. The problem is solved by a chemical treatment with a non-polar solvent which enables the components responsible for the filtration difficulties and thixotropic problems to be eliminated.

Accordingly, the addition of non-polar solvent to this paste is intended to enable the mixture to be diluted so that it, on the one hand, can be filtered and, so that it on the other hand, precipitates the substances partly soluble in the oil. The non-polar solvent is added in a ratio by weight of oil to non-polar solvent of 1:5 to 1:20 and the resulting suspension is homogenized by stirring at ambient temperature. As mentioned above, the non-polar solvent precipitates some constituents of the treated spice which are partly soluble in the oil and which, in the absence of treatment with the non-polar solvent, would subsequently precipitate during storage of the product.

The mixture is then filtered under pressure, and the precipitate is rinsed with the non-polar solvent so that all the antioxidant material and the oil pass into the non-polar solvent phase. Before this filtration step, it is preferable to complete precipitation, for example by leaving the mixture of oil and non-polar solvent standing for about 10 hours at a temperature of the order of 4° to 20° C. or by passing the mixture through a scraped-surface heat exchanger at a low temperature. After filtration, the non-polar solvent is evaporated to obtain a clear oil.

Should slight clouding occur, the oil is treated a second time with a non-polar solvent at 4° C., left standing, and filtered, and the non-polar solvent is evaporated to recover a completely clear oil.

The non-polar solvent used is selected from saturated, optionally branched and optionally cyclized, $C_{5-8}$ hydrocarbons, including mixtures thereof, volatile aromatic hydrocarbons and chlorinated solvents. Hexane, cyclohexane or petroleum ether is preferably used.

A lipidic composition containing 2 to 7% antioxidant components is preferably prepared.

After formation of the liquid spice extract, the composition may have to be decolored and deodorized, depending on the type of spice used. For decoloration, the composition is mixed with active carbon or with bleaching earth, and the resulting mixture is heated for at least one hour and then filtered. The substances responsible for color are adsorbed onto the active carbon or the bleaching earth. For deodorization, the composition is preferably subjected to falling-film or thin-layer countercurrent stripping with superheated steam in vacuo In addition to rosemary and sage, other spices are known to have antioxidant properties, including for example thyme, oregano, savory or cloves. The antioxidant principles of these spices are liquid substances or volatile substances which are partly soluble in water. Accordingly, these spices are suitable for the preparation of an antioxidant extract in liquid form by the process according to the invention.

A mixture of spices may be treated in accordance with the invention. In this case, the oleoresins are extracted from the spice mixture which is then dissolved in the oil using the process according to the invention to obtain a highly aromatic product containing both the essential oils and the antioxidants of the spices.

EXAMPLES

The invention is illustrated by the following Examples.

Example 1

1.8 kg rosemary extract obtained by the process according to EP 307 626 are dissolved in 36 l ethanol at room temperature and the solution obtained is mixed with 3 kg of a mixture of saturated $C_{6-12}$ fatty acid triglycerides. The ethanol is removed in vacuo at ambient temperature, and the paste obtained is mixed with 30 l hexane at 20° C. The suspension is then stirred for 60 minutes in a nitrogen atmosphere. After standing overnight, the suspension is filtered and the filter cake is eliminated, being washed beforehand with hexane to recover all the antioxidant material and the oil. The hexane is evaporated in vacuo, leaving 3.10 kg of a clear orange oil containing 3.6% antioxidant constituents. This oil does not form any deposits after storage for 6 months and remains clear.

Example 2

15 kg ground rosemary are extracted twice at 20° C. with 75 l 94% ethanol for 2 hours with stirring in a nitrogen atmosphere. After filtration, the ethanol phase is mixed with 3.75 kg of a mixture of saturated $C_{6-12}$ fatty acid triglycerides, and the resulting mixture is concentrated in vacuo to remove all the ethanol. 30 l hexane are added to the resulting paste at 60° C. and the solution obtained is stirred overnight at 12° C. After filtration at 12° C., the filter cake is eliminated, being washed once with hexane beforehand. The hexane is removed in vacuo, leaving 3.8 kg of a clear brown oil containing 3.4% antioxidant components.

Example 3

15 kg ground rosemary are extracted twice under reflux with 75 l 94% ethanol for 2 hours with stirring in a nitrogen atmosphere. The ethanol phase is mixed with 2.7 kg of a mixture of saturated $C_{6-12}$ fatty acid triglycerides, and the resulting mixture is concentrated to eliminate all the ethanol. The paste obtained is mixed with 30 l hexane at 60° C., and the solution obtained is stirred overnight at 12° C. It is then filtered very slowly at 12° C. after addition of 2 kg Celite (filtration aid) and the filter cake is washed twice with hexane. The hexane is removed in vacuo, leaving 2.93 kg of a clear brown oil containing 4.2% antioxidant components.

Example 4

1.5 kg rosemary extract obtained in accordance with EP 307 626 are dissolved in 80 l ethanol. 20 l (one quarter) of this solution are mixed with 3.25 kg of a mixture of saturated $C_{6-12}$ fatty acid triglycerides, and the resulting mixture is concentrated to remove all the ethanol. An oily mass is obtained which remains liquid and which can easily be taken up in 50 l hexane. The solution obtained is stirred for 30 minutes, filtered after addition of 2 kg Celite, and the filter cake is washed twice with 50 l hexane. The hexane is removed in vacuo, leaving 3.4 kg of an orange oil containing approximately 1.4% antioxidant constituents. This oil is recycled three times with 20 l of the initial ethanol solution, being concentrated vacuo to eliminate the ethanol and then treated with hexane in each cycle.

This technique of progressive enrichment cycles gives a slightly cloudy oil with an antioxidant content of 5.4%. This oil is heated to 80° C. and passed at a rate of 20 l per hour through a scraped-surface heat exchanger which is kept at a temperature of 4° C. with ice water. The product which issues from the heat exchanger at a temperature of 8° C. contains a crystalline deposit. The mixture is filtered to obtain a perfectly clear orange oil containing 5.3% antioxidant components.

Example 5

A mixture of 2 kg rosemary, 1 kg sage, 1 kg thyme and 1 kg oregano is extracted twice with 25 l ethanol at 25° C. After filtration, the ethanol phase is mixed with 1.5 kg of a mixture of saturated $C_{6-12}$ fatty acid triglycerides. The ethanol is eliminated to obtain a brown-green oil. The oil is mixed with 20 l hexane at 20° C., and the mixture is left standing and then filtered to eliminate the solid phase and the gums. The hexane is removed in vacuo to obtain 1.76 kg of a clear green oil which does not lead to any deposits, even after storage for 6 months.

Example 6

The oil obtained in Example 2 or 3 is decolored by mixing 500 g of the oil with 15 g active carbon. The mixture is then heated in vacuo for 30 minutes to 80° C. and filtered through a layer of Celite to obtain a light yellow-orange oil. The starting product was deep brown-green in color. The oil is then deodorized by thin-layer countercurrent stripping with superheated steam at 180° C. The installation used is operated with an oil throughput of 1 kg/h under a vacuum of 1 mbar, with a residence time of 25 seconds and with a ratio of oil to steam of 10:1.

We claim:

1. A process for preparing an antioxidant composition comprising:

mixing an oil with a polar solvent containing a spice extract which contains antioxidant substances, wherein the polar solvent is selected from the group consisting of $C_{1-4}$ alcohols, acetone, ethyl acetate, diethylether and methylethyl ketone and wherein the oil is selected from the group consisting of olive oil, hybrid sunflower oil, hybrid safflower oil, cocoa butter olein, sal fat olein and a mixture of fatty acid triglycerides selected from the group consisting of saturated $C_{6-12}$ fatty acid triglycerides, to obtain an extract/oil/polar solvent mixture;

evaporating the polar solvent from the extract/oil/polar solvent mixture to obtain an extract/oil mixture;

adding a non-polar solvent selected from the group consisting of petroleum ether and $C_{5-8}$ hydrocarbons to the extract/oil mixture to dilute the extract/oil mixture and to precipitate constituents of the extract and obtain a non-polar solvent-diluted extract/oil mixture and homogenizing the non-polar solvent-diluted extract/oil mixture and after homogenizing, obtaining a homgenized supernatant mixture in combination with constituents precipitated from the extract;

separating the precipitated constituents from the homogenized mixture supernatant and obtaining the supernatant mixture having a non-polar solvent phase; and evaporating the non-polar solvent from the supernatant mixture to obtain an antioxidant composition comprising the oil containing the antioxidant substances.

2. A process according to claim 1 further comprising:

mixing the antioxidant composition with a polar solvent containing a spice extract which contains antioxidant substances, wherein the polar solvent is selected from the group consisting of $C_{1-4}$ alcohols, acetone, ethyl acetate, diethylether and methyl ethyl ketone to obtain a further extract/oil/polar solvent mixture;

evaporating the polar solvent from the further extract/oil/polar solvent mixture to obtain a further extract/oil mixture;

adding a non-polar solvent selected from the group consisting of petroleum ether and $C_{5-8}$ hydrocarbons to the further extract/oil mixture to dilute the further extract/oil mixture and to precipitate further constituents of the extract and obtain a further non-polar solvent-diluted extract/oil mixture and homogenizing the further non-polar solvent-diluted extract/oil mixture and after homogenizing, obtaining a further homogenized supernatant mixture in combination with further constituents precipitated from the extract;

separating the further precipitated constituents from the further homogenized supernatant mixture and obtaining the further supernatant mixture having a further non-polar solvent phase; and evaporating the non-polar solvent from the further supernatant mixture to obtain a further antioxidant composition comprising the oil containing the antioxidant substances.

3. A process according to claim 2 further comprising repeating the process of claim 2 at least once, wherein the antioxidant composition mixed with the polar solvent containing the spice extract is the antioxidant composition produced by the process of claim 2, to further enrich the further antioxidant composition oil with antioxidant substances.

4. A process according to claim 1 or 2 or 3 further comprising decoloring and deodorizing the antioxidant composition.

5. A process according to claim 1 or 2 or 3 wherein the spice extract is an extract of a spice selected from the group consisting of sage, rosemary, thyme, oregano, savory and clove.

6. A process according to claim 2 wherein the antioxidant composition of claim 1 is mixed with the polar solvent containing the spice extract in a ratio by weight of antioxidant composition oil to dry spice extract of from 10:1 to 1:2 and wherein the non-polar solvent is added in a ratio by weight of antioxidant composition oil to non-polar solvent of from 1:5 to 1:20.

7. A process according to claim 1 or 2 wherein the polar solvent is ethanol, the non-polar solvent is hexane and the oil is a mixture of fatty acid triglycerides selected from the group consisting of saturated $C_{6-12}$ fatty acid triglycerides.

8. A process according to claim 7 wherein the mixture of fatty acid triglycerides comprises caprylic acid and capric acid.

9. A process according to claim 1 or 2 wherein the solvent-diluted extract/oil mixture is homogenized by stirring and the further extract/oil mixture is homogenized by stirring.

10. A process according to claim 1 wherein the oil is mixed with the polar solvent containing the spice extract in a ratio by weight of oil to dry spice extract of from 10:1 to 1:2 and wherein the non-polar solvent is added in a ratio by weight of oil to non-polar solvent of from 1:5 to 1:20.

11. A process according to claim 1 wherein the oil is a mixture of fatty acid triglycerides selected from the group consisting of saturated $C_{6-12}$ fatty acid triglycerides.

12. A process according to claim 11 wherein the polar solvent is selected from the group consisting of ethanol and methanol and wherein the non-polar solvent is selected from the group consisting of petroleum ether, hexane and cyclohexane.

13. A process according to claim 1 or 2 wherein the polar solvent is selected from the group consisting of ethanol and methanol and wherein the non-polar solvent is selected from the group consisting of hexane, cyclohexane and petroleum ether.

14. A process according to claim 1 wherein the solvent-diluted extract/oil mixture is homogenized by stirring.

\* \* \* \* \*